United States Patent [19]

Köppern et al.

[11] 4,337,023

[45] Jun. 29, 1982

[54] ROLLER PRESS FOR COMPACTING AND BRIQUETTING OF BULK MATERIAL

[75] Inventors: Heinz Köppern, Hattingen; Hans-Georg Bergendahl, Bochum; Hartmut Rieschel; Friedhelm Koch, both of Hattingen, all of Fed. Rep. of Germany

[73] Assignee: Maschinenfabrik Köppern GmbH & Co. KG, Hattingen, Fed. Rep. of Germany

[21] Appl. No.: 261,700

[22] Filed: May 8, 1981

[30] Foreign Application Priority Data

Oct. 5, 1980 [DE] Fed. Rep. of Germany ....... 3017962

[51] Int. Cl.3 ......................... B29C 3/02; B29C 15/00

[52] U.S. Cl. ......................... 425/237

[58] Field of Search ......................... 425/237, 194

[56] References Cited

U.S. PATENT DOCUMENTS

| | | | |
|---|---|---|---|
| 3,077,634 | 2/1963 | Komarek et al. | 18/21 |
| 3,635,637 | 1/1972 | Bergendahl | 425/363 |
| 3,829,267 | 8/1974 | Woodward | 425/237 |
| 3,907,486 | 9/1975 | Kennedy | 425/471 |
| 3,938,930 | 2/1976 | Lauterbach | 425/472 |
| 3,969,062 | 7/1976 | Komarek | 425/471 |
| 4,097,215 | 6/1978 | Komarek | 425/237 X |
| 4,123,971 | 11/1978 | Bergendahl | 425/237 X |
| 4,261,692 | 4/1981 | Kuby | 425/237 X |

FOREIGN PATENT DOCUMENTS

| | | |
|---|---|---|
| 2449250 | 4/1975 | Fed. Rep. of Germany . |
| 2536815 | 3/1977 | Fed. Rep. of Germany . |

*Primary Examiner*—J. Howard Flint, Jr.

*Attorney, Agent, or Firm*—Gottlieb, Rackman & Reisman

[57] ABSTRACT

A roller press for compacting and briquetting bulk material having rollers, each comprising a core, segments arranged adjacent one another around the surface of the core, adjusting springs by which the segments are fixed on the roller core in the circumferential direction, clamping rings having frusto-conical faces on projections which abut frusto-conical faces on projections on the segments, and clamping bolts extending through the clamping rings and passing between the longitudinal edges of the segments. Each clamping ring is provided at its inner circumference with adjusting spring grooves parallel to the axis of the clamping ring and the adjusting springs for the segments extend parallel to the axis of the roller beyond the end of the segment to such an extent that they engage in the adjusting spring grooves in the clamping ring.

5 Claims, 4 Drawing Figures

Fig. 4
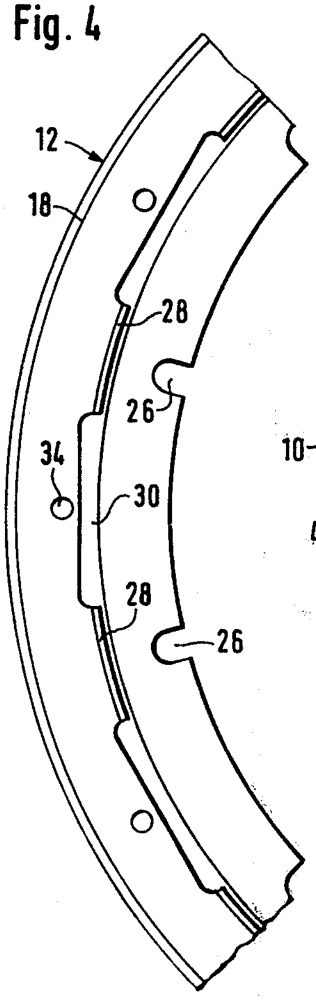
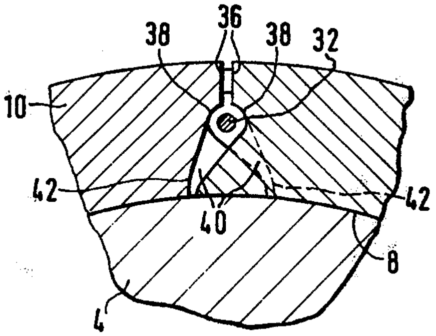
Fig. 3

ROLLER PRESS FOR COMPACTING AND BRIQUETTING OF BULK MATERIAL

BACKGROUND OF THE INVENTION

The invention relates to a roller press, for compacting and briquetting bulk material, of the type having rollers each comprising a core having a cylindrical surface, a plurality of segments resting on the cylindrical surface of the roller core adjacent one another along their longitudinal edges parallel to the axis and which, in each case, are provided at their ends with shoulder faces which extend at an acute angle of less than 45° to the axis of the roller; adjusting springs extending parallel to the axis of the roller by means of which the segments are fixed on the roller core in the circumferential direction; holding elements which overlap the shoulder faces, and clamping bolts for the holding elements which are passed between the longitudinal edges of the segments and which are located in recesses in said longitudinal edges.

DESCRIPTION OF THE PRIOR ART

In a known roller press of this type (DE-OS-2536815) clamp straps are provided as the holding elements. These act as levers and are retained in the region of the external circumference of the roller core by swivel axes crossing the clamp straps and arranged in the tangential direction in this region. The clamp straps are, in each case, arranged in the region of the longitudinal edges of two neighbouring segments.

In these known roller presses, the separate mounting of each individual clamp strap is expensive.

A roller press is also known in which V-shaped cutouts parallel to the axis are provided in the circumference of the roller core. The segments are mounted in the cut-outs by means of their correspondingly-shaped undersides. The segments are provided with shoulder faces which are situated on the casing surface of a truncated cone whose axis coincides with that of the roller. The apical angle of the cone may be acute or obtuse. A closed holding ring concentric with the axis of the roller is arranged as the holding element on each of the two ends of the roller and the surfaces of the rings which overlap the shoulders on the segments are of a suitable conical shape. The holding rings are braced together by means of clamping bolts parallel to the axis of the roller and which are passed through the roller core in bores parallel to the axis. The holding rings are mounted in a ring groove radially inwards from the clamping bolts and at the base of the ring groove they rest on the roller core. In an axial extension of the segments such as may occur in particular owing to heat expansion of the segments in hot-briquetting, a tilting movement of the holding ring may be produced owing to which the conical application faces of the holding rings and the shoulders of the segments may lift off each other (DE-AS 1 300 049) - DE-OS 2449250).

It is also known in roller presses to design the segments with straight shoulders on to which shrunk rings are contracted. In such roller presses, when the segments are changed, the shrunk rings must always be heated sufficiently to allow the rings to be pulled off in the axial direction. Attachment of the segments by means of shrunk rings is also possible for hot briquetting when the shrunk ring is provided with an annular channel for a cooling medium (DE-AS 1928176).

It is an object of the invention to further develop a roller press of the type described in the introduction hereof in such a way that a simpler mounting is possible and a particularly reliable holding of the segments is achieved.

SUMMARY OF THE INVENTION

This object is solved according to the invention in that the holding elements are a pair of continuous clamping rings which are provided with projections having frusto-conical shoulder faces having an arrangement and a circumferential width such that the shoulder faces on the segments are abutted in their central regions, by the shoulder faces on the clamping rings and each clamping ring is provided at its inner circumference with adjusting spring grooves parallel to the axis of the clamping ring and the adjusting springs for the segments project, parallel to the axis of the roller, beyond the end of the segment to engage in the adjusting spring grooves in the clamping ring.

Preferably, all the adjusting springs project beyond the ends of the segments and the clamping rings are provided with grooves for receiving all the adjusting springs. For use in hot-briquetting the clamping rings may be provided with channels for a cooling medium. The shoulder faces of the segments and of the clamping rings are conveniently frusto-conical faces.

BRIEF DESCRIPTION OF THE DRAWINGS

By way of example an embodiment of a roller for a roller press in accordance with the invention is illustrated in the accompanying drawings and is described in more detail in the following with reference to the drawings in which:

FIG. 3 shows a section along the line C—C in FIG. 2, and

FIG. 4 shows a part of a clamping ring viewed from the side thereof adjacent the segments against which the clamping ring is applied.

DESCRIPTION OF THE PREFERRED EMBODIMENT

Figure 1:
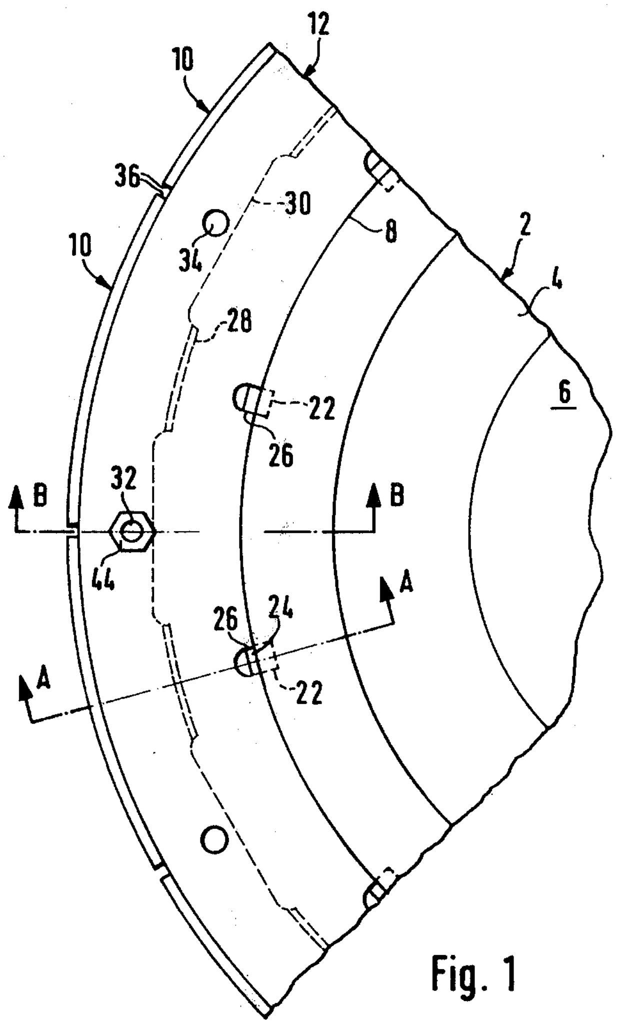
FIG. 1 shows an end elevation view of a quarter circle portion of a roller.

FIG. 1 illustrates a quarter circle portion of the roller of the roller press for the compacting and briquetting of bulk material. The roller 2 has a roller core 4 which is provided at both ends with journal pins 6 and has a smooth cylindrical surface 8. Segments 10 are mounted on the external cylindrical surface 8 of the roller 2 and are held in position on the roller core 4 by means of the two continuous clamping rings 12.

The segments 10 may be designed to be smooth on their external surface when they form a closed annular surface. Moulding depressions may also be provided in the surface of the segments.

The segments 10 are provided at their ends with protrusions 14 having oblique shoulder faces 16 which are, in each case, overlapped by the clamping rings 12 by means of an annular projection 18 on the latter.

The segments 10 are, in each case, provided at the mid-points of their inner peripheries with adjusting spring grooves 20, opposite to which these are situated corresponding adjusting spring grooves 22 in the cylindrical surface 8 of the roller 2. The segments 10 are held in the circumferential direction of the roller by means of adjusting springs 24 mounted in the adjusting spring grooves 20,22. An adjusting spring 27 is provided at the central region between the end faces of the core 4 for axial attachment of the segments 10 to the core.

Figure 2:
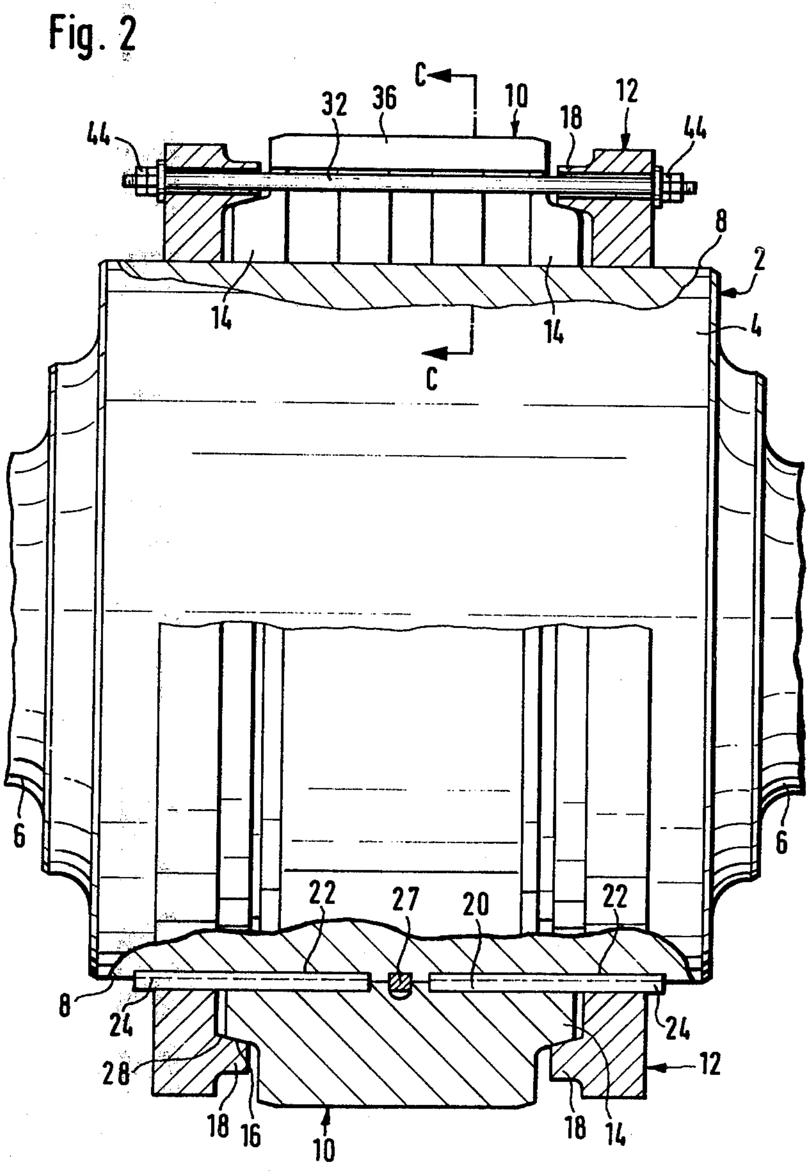
FIG. 2 shows, partly cut away and partly in plan view, a roller of a roller press where the segments in their attachment are shown at the bottom in section along the line A—A in FIG. 1 and at the top in section along the line B—B in FIG. 1.

As is shown at the bottom of FIG. 2, the adjusting springs 24 extend outward beyond the ends of the segments 10, in particular, sufficiently far to allow the clamping rings 12 to be pushed on to the adjusting springs 24, where the clamping rings 12 are, at the same time, provided with the adjusting spring grooves 26 for this purpose. Because the clamping rings 12 in their working position are fixed in the circumferential direction by the adjusting springs 24 or by at least one adjusting spring 24, movement of the clamping rings 12 in the circumferential direction during use is avoided. It may be provided that the adjusting spring 24 of one segment 10 is lengthened outwards beyond the end of the segment 10 in the manner described. However, the majority of the adjusting springs 24 or all the adjusting springs 24 may be extended in the manner described.

As has been stated, the adjusting springs 24 are, in each case, arranged at the mid-points of the inner peripheries of the segments. In a circumferentially central region of each segment 10 the projection 18 of each clamping ring is provided with an inside shoulder face 28, which extends over a limited circumferential width of the segment in this region. The circumferential contact width may be chosen to be between 25 and 50% of the circumferential width of the segment. The shoulder faces 16, 28 coming into abuttment against each other in mounting are frusto-conical faces of a cone whose apical angle is situated on the axis of the roller 2 or on the axis of the clamping ring 12 and which has an angle of the order of magnitude of 10°. Between th mounting shoulders 28 there are, in each case, situated annular sections 30 within which the annular projection 18 does not make contact with the shoulder faces of the segment 10. Owing to the arrangement of the clamping at the centre of the segments 10 it is achieved that unavoidable micro-movements of the segments 10 on the clamping device appear only to a small degree. Thus, the clamping device is only impaired by such micro-movements to a very small degree.

The clamping rings 12 are connected together by means of clamping bolts 32 which are passed through bores 34 in the clamping rings and are led through the segments 10 in the region of their longitudinal edges 36. This mounting of the clamping bolts 32 is illustrated in FIG. 3. In the embodiment illustrated the segments 10 have a plurality of supporting claws 40 on their longitudinal edges 36 which project in the circumferential direction of the inner peripheral surfaces of the segments 10 beyond the radial extension of the longitudinal edges parallel to the axis and recesses 42 lying between them, where one supporting claw 40 is situated on the longitudinal edge of a segment, in each case, opposite to a recess 42 designed to accept the claw on the longitudinal edge of the other segment. In such a known design of the segments 10 (DE-PS 2055147) recesses 38 through which the clamping bolts 32 may be passed are provided in the upper prolongation of the supporting claws or the recesses 42, in each case. This embodiment is particularly convenient for cast segments, particularly for segments 10 manufactured by chill-casting. Fundamentally it is also possible to pass bores through the segment in-so-far as the material allows machining with detachment of a cutting.

In the embodiment illustrated by way of example, the bores 34 are arranged on a pitch circle which is situated slightly radially outside the application shoulders 28. In this embodiment, after tightening of the clamping bolts by means of the nuts 44 arranged on their ends, a tensional force is applied to the clamping rings which prevents tilting of the clamping rings 12 during operation.

Owing to the holding of the clamping rings 12 by means of the adjusting springs 24, it is ensured that the clamping bolts 32 remain free of the segments 10 even during operation, that is there is no contact of the bolts 32 with the longitudinal edges or, where relevant, with the bore surfaces in the segments 10. Any radial loading of the clamping bolts 32 is excluded in this way. It is also ensured, because of the attachment of the clamping rings 12 in the circumferential direction, that the clamping bolts 32 are loaded by tension only during operation.

The mode of attachment of the segments 10 on the roller core 4 as described herein is suitable both for roller presses for hot-briquetting and also for roller presses which operate at room temperature or only slightly higher temperatures. In use for hot-briquetting, it may be convenient to provide the clamping rings 12 with a cooling channel and to provide inlet and outlet channels for a cooling medium to be passed through the roller core, in a known manner. In briquetting at raised temperatures, where a noticeable lengthening of the segments 10 is to be anticipated, the clamping bolts 32 should consist of a material having a heat expansion coefficient equal to that of the segments.

The projections 14 of the segments 10 need to be provided with oblique shoulder faces only in those regions where the clamping rings 12 engage with them.

What I claim as my invention and desire to secure by Letters Patent of the United States is:

1. A roller press for compacting and briquetting bulk material having rollers, each comprising a core having a cylindrical surface, a plurality of segments resting on the cylindrical surface of the roller core adjacent one another along their longitudinal edges parallel to the axis and which, in each case, are provided at their ends with shoulder faces which extend at an acute angle of less than 45° to the axis of the roller; adjusting springs extending parallel to the axis of the roller by means of which the segments are fixed on the roller core in the circumferential direction; holding elements which overlap said shoulder faces, and clamping bolts for the holding elements which are passed between the longitudinal edges of the segments and which are located in recesses in said longitudinal edges, said holding elements being a pair of continuous clamping rings which are provided with projections having frusto-conical shoulder faces having an arrangement and a circumferential width such that the shoulder faces on the segments are abutted in their central regions by the shoulder faces on the clamping rings, each clamping ring provided at its inner circumference with adjusting spring grooves parallel to the axis of the clamping ring and the adjusting springs for the segments projecting, parallel to the axis of the roller, beyond the end of the segment to such an extent that they engage in the adjusting spring grooves in the clamping ring.

2. A roller press according to claim 1 in which all the adjusting springs project beyond the ends of the segments and the clamping rings are provided with grooves for receiving all the adjusting springs.

3. A roller press according to claim 1 or 2 in which the clamping rings are provided with channels for a cooling medium.

4. A roller press according to claim 1 or 2, in which the shoulder faces of the segments and the shoulder faces of the clamping rings are frusto-conical surfaces.

5. A roller for a roller press for compacting and briquetting bulk material, the roller comprising a core having a cylindrical surface, a plurality of segments resting on the cylindrical surface of the roller core adjacent one another along their longitudinal edges parallel to the axis and which, in each case, are provided at their ends with shoulder faces which extend at an acute angle of less than 45° to the axis of the roller; adjusting springs extending parallel to the axis of the roller by means of which the segments are fixed on the roller core in the circumferential direction; holding elements which overlap said shoulder faces, and clamping bolts for the holding elements which are passed between the longitudinal edges of the segments and which are located in recesses in said longitudinal edges, said holding elements being a pair of continuous clamping rings which are provided with projections having frusto-conical shoulder faces having an arrangement and a circumferential width such that the shoulder faces on the segments are abutted in their central region by the shoulder faces on the clamping rings, each clamping ring provided at its inner circumference with adjusting spring grooves parallel to the axis of the clamping ring and the adjusting springs for the segments projecting, parallel to the axis of the roller, beyond the end of the segment to such an extent that they engage in the adjusting spring grooves in the clamping ring.

* * * * *

UNITED STATES PATENT AND TRADEMARK OFFICE
CERTIFICATE OF CORRECTION

PATENT NO. : 4,337,023
DATED : June 29, 1982
INVENTOR(S) : Köppern, et al.

It is certified that error appears in the above-identified patent and that said Letters Patent are hereby corrected as shown below:

Column 1, line 59, after "1 300 049" insert -- , corresponding to U.S. Patent No. 3,077,634 --; Column 1, line 59, after "2449250" insert -- , corresponding to U.S. Patent No. 3,938,930 --; Column 1, line 68, after "1928176" insert -- , corresponding to U.S. Patent No. 3,635,637 --.

Signed and Sealed this

*Twenty-sixth* Day of *October 1982*

[SEAL]

*Attest:*

GERALD J. MOSSINGHOFF

*Attesting Officer* *Commissioner of Patents and Trademarks*